March 7, 1939.     G. R. WEBBER     2,149,713
TEA BAG
Filed July 21, 1936
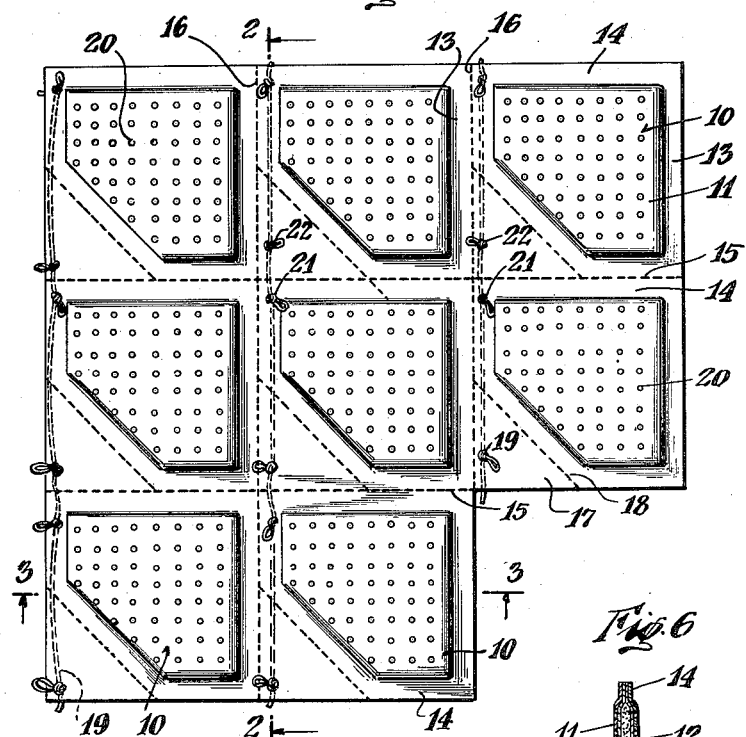
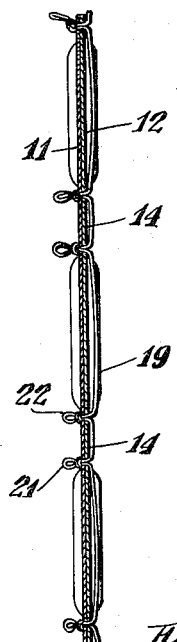
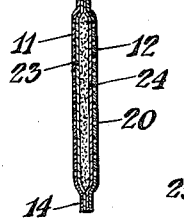
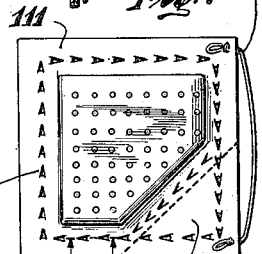
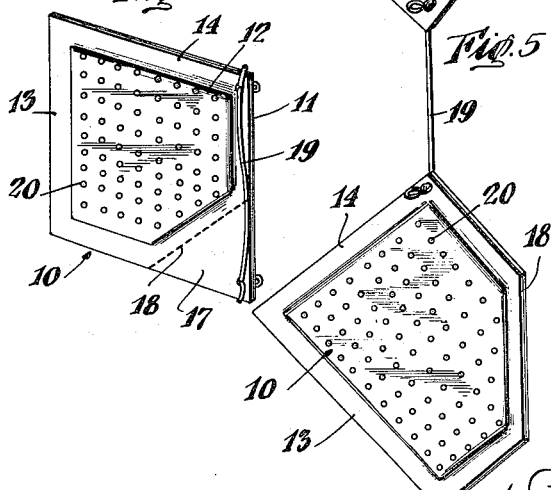
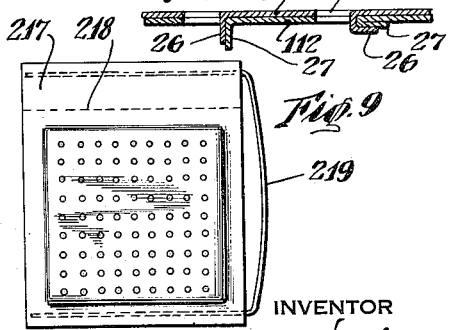
INVENTOR
George R. Webber
BY
Watson, Bristol, Johnson & Leavenworth
ATTORNEYS.

Patented Mar. 7, 1939

2,149,713

UNITED STATES PATENT OFFICE 2,149,713

TEA BAG

George R. Webber, Grantwood, N. J., assignor to Standard Brands Incorporated, New York, N. Y., a corporation of Delaware Application July 21, 1936, Serial No. 91,714

19 Claims. (Cl. 99—77.1)

This invention relates to tea bags and their manufacture.

General objects of the invention are to provide improved economical tea bags and improved methods of making them.

More particularly, an object of the invention is to provide a tea bag having a string attached tag constructed of inexpensive materials in a novel and highly efficient manner, which can be marketed at a reduced cost.

Further objects of the invention are to provide a tea bag made of paper or similar inexpensive sheet material having adhesively joined sides and including a detachable tag portion connected by a string to its main portion.

Another object is to provide a method of making a plurality of tea bags having improved characteristics such as those mentioned above at speeds higher than those attainable with previous types of tea bags or balls.

Additional objects are to provide tea bags which are sturdily constructed of inexpensive materials, attractive and salable, easy to make, and easy to handle and package in quantities.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which:

Fig. 1 is a fragmentary plan view of a plurality of tea bags embodying principles of the invention, prior to their separation into individual units;

Fig. 2 is a longitudinal sectional view along line 2—2 of Fig. 1;

Fig. 3 is a transverse sectional view along line 3—3 of Fig. 1;

Fig. 4 is a perspective view of an individual tea bag unit;

Fig. 5 is a perspective view of the tea bag shown in Fig. 4 with its detachable tag torn free, the bag being ready for use;

Fig. 6 is a sectional view through another form of tea bag embodying principles of the invention;

Fig. 7 is a plan view of an individual tea bag showing another form of attaching its sides;

Fig. 8 is a sectional view taken along line 8—8 of Fig. 7, and,

Fig. 9 is a plan view of another form of individual tea bag embodying principles of the invention.

A popular way of merchandizing tea is to pack a limited quantity suitable for brewing one cup in an individual tea bag or ball. These individual containers have previously taken many forms such as metal or papier-mâché tea balls, stitched bags of cloth or Cellophane, and the like. The most popular and widely sold form up until the present time has been the stitched cloth tea bag having a separate string attached tag serving as a handle from which it may be immersed in a cup or pot of hot water.

The present invention provides a tea bag having all of the advantages of such a tagged cloth bag, and which has the additional advantage of avoiding or speeding up many of the steps incident to the manufacture of such a bag, while effectively utilizing relatively inexpensive materials.

Referring more particularly to the drawing in which preferred embodiments are shown, and first to Figs. 1, 2 and 3, there is shown a plurality of tea bags each generally designated 10 formed of opposite front and back sheets 11 and 12. These sheets are made of inexpensive heat and water resistant material, preferably of parchment paper, many suitable forms of which are available on the market and some of which are now used for cooking purposes. This sheet material should have sufficient mechanical strength to withstand packaging and shipping and should be capable of being squeezed or pressed while immersed in hot water without tearing. Parchment paper has these qualities and is a preferred material.

Other suitable and desirable forms of sheet material are contemplated, such as other types of papers, transparent regenerated cellulose or other non-fibrous cellulose derivative sheet materials, and some of the benefits and economies of the invention can be obtained even with the use of relatively expensive textile fabrics such as are used in the previous cloth tea bag when such fabrics are assembled in accordance with the principles of this invention as hereinafter set forth.

The sheets forming sides 10 and 11 preferably are initially wide enough to form a number of individual tea bags in side by side relation, say ten, although for convenience only three are thus illustrated in Fig. 1, and may be run from continuous rolls of indefinite length.

A charge of tea is spot-loaded on one sheet or side and the other sheet is adhesively attached to the first one around each of these charges.

The adhesive used is capable of keeping the sheets joined when immersed in hot water and preferably comprises a thermo-set or thermo-plastic cement, the material being of a quality that will not plasticize or that at least will not lose its adhesive properties at the temperature of boiling water. A suitable type of thermo-set adhesive is known on the market as "Bakelite" cement and is desirable for use in the present invention because it has the property of staying fixed under high temperatures. A suitable form of thermo-plastic cement is known as "Vinylite", but any other suitable adhesive such as various synthetic resin cements or cellulose derivative cements may be employed. The cement, as well as the sheet material, should be tasteless and odorless in the completed bag. The cement may be applied as a coating over the entire opposed surfaces of sides 11 and 12, or it may be applied only in limited areas bounding the tea charge. It is also contemplated that the adhesive may be incorporated in the sheet material comprising sides 10 and 11 during its manufacture, or that this material may be inherently of a nature to adhere to itself when subjected to heat and pressure.

The sheets 10 and 11 are pressed into adhesive contact along longitudinal marginal areas 13 and transverse marginal areas 14 between the several charges of tea, and are adapted to be severed later along transverse lines 15 and longitudinal lines 16 into individual units which are approximately square in the form illustrated. Any other suitable form or shape may be provided by means of suitably intersected strips of adhesive.

One corner of each unit is pressed into adhesive contact over a larger triangular area defining a tag 17 which is separated from the body portion of the tea bag by an oblique line of perforations 18 affording ready detachment of the tag. When the tea bags are made in a group as in Fig. 1, the tag portion is located at a corresponding corner of each bag, and a string 19 is run lengthwise exteriorly along each longitudinal series of bags. The string is passed through a corner of a tag 17 and knotted, and then is run to a corner of the body portion of a corresponding tea bag where it re-enters and passes through the sheet material and is again knotted, this procedure being continued along the full length of the connected bags as shown in Figs. 1 and 2.

These operations are adapted to be carried out on suitable machinery which need not be described in detail in order to understand the present invention. When a heat and pressure responsive adhesive is coated over or incorporated in the sheets 11 and 12, the pressing together of the marginal areas 13 and 14 may be effected by means of suitable dies which preferably are mounted on opposed rollers, and wet adhesives may also be properly applied in the required local areas by means of known types of packaging equipment. The side sealing conveniently may be partially effected and the two halves of the tag 17 may be pressed together before the tea is loaded in a given bag, and the sealing operation may thereafter be completed to form a closed container.

The tea holding portion of each container is provided with a plurality of perforations 20 which are small enough to confine the tea leaves and large enough to afford full communication between the tea and the hot water in which it is immersed. These perforations are preferably made in the sheets 11 and 12 while they are being fed from their respective rolls and at a convenient time before the loading operation. These perforations may be regularly arranged as illustrated in the drawing or they may be stamped in the form of the manufacturer's name or trade-mark. The portion of each bag comprising the tag 17 is also intended to be printed or embossed during the making of the bags. This tag may conveniently be printed with matter identifying individual users of the tea bags, such as hotels and restaurants, by providing a simple interchangeable steel die for each such user. Printed matter may also be located on the main body portion of the bag, care being taken to use a permanent ink or coloring material, so that the entire unit is given an attractive and salable appearance.

The strings 19 are run in a simple straight line direction and the knotting operations are easy to effect by mechanical means, the entire arrangement being such that there is no need to encounter the trouble with tangling that is sometimes met in previous cloth tea bag equipment. The assembled tea units are preferably first cut along longitudinal lines 16 and thereafter along the transverse lines 15, the latter cut dividing the string 19 between adjacent knots 21 and 22 so that the cord for each tea bag unit has its ends respectively anchored in the bag and body portion with the string running exteriorly of the tea bag. The perforated tear line 18 is also preferably formed at a convenient period during or prior to assembly. Instead of perforations, any suitable form of scoring or weakening may be employed, or the tear line may be simply indicated without weakening, if the material is sufficiently amenable to being torn.

The entire arrangement is such that completely formed tea bag units can be made at much higher speeds than have been possible with previous bags, and from materials which are relatively inexpensive. These materials are fully utilized without any waste, and there is no need to purchase extra tags. This increase in speed of production and efficient utilization of inexpensive materials greatly reduces the cost of manufacture.

If desired, the bags may be sold or shipped in assembled groups as illustrated in Fig. 1, subject to severance before use, but usually they are severed at their place of manufacture. The individual tea units are relatively flat and well shaped for packaging in quantity, and the strings are out of the way at this time, so that neat bundles can readily be formed.

A tea bag constructed in the above manner is shown ready for use in Fig. 5. Here the tag 17 has been torn from the corner of the remainder of the bag along the tear line 18 but remains connected thereto by the string 19. The tag and string are isolated from the interior of the tea containing portion of the bag by the adhesively fastened margins of the latter so that the detachment of the tag 17 with its string 19 does not open the tea container.

If the tea comprises very small leaves or becomes dry and powdered during handling, there may be some tendency for part of it to sift through the perforations 20. To avoid this, the arrangement shown in Fig. 6 is provided. Here the sheets 11 and 12 which may be of tasteless and odorless parchment paper, or any of the other suitable materials mentioned, are each provided with a coextensive lining 23 and 24 of filter paper or the like. The sheets 11 and 12 are provided with perforations 20 which may be of large size, if desired, but the filter paper remains imperforate, except for its naturally porous condition. Preferably, a thin coarse pored filter paper is used, and with such a paper it is found that the tea leaves readily flavor the water in which they are immersed. Instead of filter paper, other suitable porous or permeable sheet materials may be used. The bounding margins of the tea bag are adhesively or otherwise suitably fastened throughout the several plies of parchment and filter paper, and the tag 17 and other characteristic features of the bag are provided substantially in the manner described in connection with the first form.

In Figs. 7 and 8, another method of joining the opposite sides of the bag is shown. Here, the two sides 111 and 112 are marginally punched at 25 to provide downwardly extending tabs 26 and 27 which are then wiped back and clenched as shown at the right side of Fig. 8. The margins are punched at sufficiently close intervals to hold the sheets closely together and prevent sifting of tea through the edges, although it is obvious that water may pass therebetween. The bag is provided with a detachable tag 117 which is connected with the body portion by a string 119. The two sides of the tag are joined by punched and clenched tabs and the tag and string are isolated from the interior of the tea containing portion of the bag by the clenched margins thereof as illustrated.

Considered broadly, any suitable fastening may be employed for holding the two sheets together, and where adhesive is used it may be spotted along the margin if desired to facilitate percolation.

Another way of attaching the tag and string is illustrated in Fig. 9 where the tea bag is formed of two opposed sides having adhesively attached margins. One marginal end of the bag provides a tag 217 and a string 219 has its ends adhesively fastened between the opposite sides of this tag portion 217 and the opposite sides at the other end of the bag. The tag 217 is separated from the body portion of the bag along a weakened tear line 218. This form of bag is adapted to be manufactured in continuous strips of a width corresponding to a single unit, and, if desired, a single sheet folded along the side 28 and adhesively fastened around the other three sides may be used in lieu of two separate sheets.

While the invention is primarily useful as a tea bag, it will be understood that its features may be employed with benefit in other connections. Thus the perforate container having a porous lining may be used to advantage in packaging various loose or powdered substances besides tea which are intended to be immersed in a fluid. Accordingly the invention is not intended to be strictly limited to tea as a packaged substance.

It will be seen that tea bags and methods of making them have been provided which are well suited to fulfill their intended functions. Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A tea bag comprising a body portion having its sides joined at their margins, a tag member attached directly to said body portion in physical contact therewith and carried directly thereby, the major portion of said tag member constituting a tag detachable from said body portion by separation, and an exterior string connecting said tag and body portion.

2. A tea bag comprising a body portion of paper or the like, a detachable tag attached to an edge of said body portion along a weakened tear line, and an exterior string connecting said tag and body portion.

3. A tea bag comprising opposed sheets adhesively attached along their margins to form a container, a tag comprising an extension of at least one of said sheets and adapted to be torn from said container without opening it, and an exterior string connecting said tag and container.

4. A tea bag comprising opposed sheets adhesively fastened along their margins to form a container, a portion of said adhesively attached margin being arranged to be torn from the remainder of the bag so as to form a detachable tag, and an exterior string connecting said tag and said remainder of the bag.

5. A tea bag comprising opposed sheets of paper or the like adhesively attached along their margins to form a container, a portion of said adhesively attached margin being separated from the remainder of the bag by a weakened tear line to form a detachable tag, and an exterior string connecting said tag and the remainder of the bag.

6. A tea bag comprising a closed container and a tag member affixed directly thereto in physical contact therewith and carried directly thereby, the major portion of said tag member constituting a tag detachable from said container by separation, and a string having its ends respectively anchored to said tag and container, said tag and string being isolated from the interior of said container so that said tag can be detached without opening the container.

7. A tea bag comprising opposed sides of perforate sheet material each having a lining of filter paper, and an adhesive fastening the margins of said sides to form a closed container, one of said margins including a detachable tag portion, and a string connecting said tag portion and the remainder of the bag.

8. A tea bag comprising opposed sides of perforate tough paper or the like, one of said sides being punched through and clenched to the other at intervals about the margin of the bag to form a tea holding container, at least one of said sides having a portion extending beyond said clenched portion to form a tag adapted to be torn from the tea container, and a string connecting said tag portion and the remainder of the tea bag.

9. An article of manufacture comprising two opposed sheets, adhesive joining said sheets along intersecting strips to provide a plurality of alined tea-holding units, and a string passing along each row of alined units and fastened at two spaced points to each unit, each unit having a weakened tear line located within its adhesively joined portions between said spaced points.

10. An article of manufacture comprising two opposed sheets, adhesive joining said sheets along intersecting longitudinal and transverse strips to provide a plurality of closed container units, said adhesive being extended over a corresponding corner area of each of the several units to form a detachable tag portion, and a string passing along one side of each row of alined units with portions passing through and anchored on the other side of such units at spaced points respectively located in the tag portion and the remaining portion of each unit.

11. A method of making tea bags which comprises placing two sides of flexible sheet material in face to face relation, spot loading separate charges of tea therebetween, separating such charges by attaching said sheets to each other around the boundary of each charge to form individual units, forming part of each unit into a detachable tag, and stringing each tag to the remainder of its respective unit by running a string along a plurality of the units and attaching it to each of the tags and bag portions of the units, and separating said units with severance of the string between the units.

12. A method of making tea bags which comprises placing two sides of flexible sheet material in face to face relation, adhesively joining said sheets along intersecting strips to form a plurality of tea-holding units and filling said units with tea, running a string along each row of such units and attaching it to two spaced points in the adhesively joined margin of each unit, forming a weakened tear line within the adhesively attached portion of each unit between said points, and separating said units with severance of the string between the units.

13. A method of making tea bags which comprises placing two sheets of tough paper or the like in face to face relation with separate charges of tea spot loaded therebetween, perforating said sheets adjacent the position of each charge, adhesively attaching said sheets along strips marginally bounding each charge to form individual units, extending said adhesive attachment at one portion of each unit to form a tag portion, forming a weakened tear line between said tag portion and the tea containing portion of each unit, running a string continuously along a row of units and anchoring it to the tag portion and remaining portion of each unit, cutting said units apart and severing said string between adjacent units.

14. A tea bag comprising, opposed layers of packaging material sealed together to form an envelope having one side thereof extended to form a separable tag, and a dipping string extending from between said layers of said envelope in a sealed area to a position between the sealed areas of said material forming said tag.

15. A tea bag comprising, a unitary container structure separable into two portions one of which comprises a commodity container, and a connecting element extending between said two portions so that one portion may be suspended from the other after separation.

16. A tea bag and the like structure comprising, opposed layers of packaging material having a thermo-plastic coating thereon and bonded together to form an envelope with a surrounding sealing flange, a string having one end held between the layers of one portion of said flange and the other end held between the layers forming another portion of said flange, at least one of said portions of said flange being detachable from said envelope structure to provide a dipping tag for said envelope.

17. A tea bag and the like structure comprising an envelope having sealing flanges upon opposite sides of a centrally disposed commodity containing enclosure, a dipping string having the ends thereof mounted in said flange portions substantially parallel with each other, one of said flange portions being detachable from said envelope structure.

18. A tea bag and the like comprising a package composed of packaging material having a container structure and having an extending part thereof in the form of a tag adapted to be torn from the structure, and a dipping string extending between said container structure and said tag to permit said container structure to be suspended from said tag when said tag is detached.

19. A tea bag and the like comprising, an envelope composed of packaging material and having a side thereof extended to form a detachable tag, and a dipping appendage extending between said tag and said envelope structure to permit said envelope structure to be suspended from said tag when detached.

GEORGE R. WEBBER.